United States Patent
Weir et al.

(10) Patent No.: US 7,466,536 B1
(45) Date of Patent: Dec. 16, 2008

(54) UTILIZATION OF POLY(ETHYLENE TEREPHTHALATE) PLASTIC AND COMPOSITION-MODIFIED BARIUM TITANATE POWDERS IN A MATRIX THAT ALLOWS POLARIZATION AND THE USE OF INTEGRATED-CIRCUIT TECHNOLOGIES FOR THE PRODUCTION OF LIGHTWEIGHT ULTRAHIGH ELECTRICAL ENERGY STORAGE UNITS (EESU)

(75) Inventors: Richard Dean Weir, Cedar Park, TX (US); Carl Walter Nelson, Austin, TX (US)

(73) Assignee: EEStor, Inc., Cedar Park, TX (US)

( * ) Notice: Subject to any disclaimer, the term of this patent is extended or adjusted under 35 U.S.C. 154(b) by 112 days.

(21) Appl. No.: 10/917,144

(22) Filed: Aug. 13, 2004

(51) Int. Cl.
*H01G 4/06* (2006.01)
*H01G 4/30* (2006.01)

(52) U.S. Cl. .................... 361/311; 361/301.4; 361/323

(58) Field of Classification Search .............. 361/301.4, 361/311–313, 323
See application file for complete search history.

(56) References Cited

U.S. PATENT DOCUMENTS

| | | | |
|---|---|---|---|
| 3,947,553 A | 3/1976 | Moss | |
| 4,671,618 A | 6/1987 | Wu et al. | |
| 4,733,328 A | 3/1988 | Blazej | |
| 4,834,952 A | 5/1989 | Rollat | |
| 5,017,446 A | 5/1991 | Reichman et al. | |
| 5,043,843 A * | 8/1991 | Kimura et al. | 361/308.1 |
| 5,045,170 A | 9/1991 | Bullock et al. | |
| 5,087,437 A | 2/1992 | Bruno et al. | |

(Continued)

FOREIGN PATENT DOCUMENTS

JP   55154321   12/1980

(Continued)

OTHER PUBLICATIONS

Guardian, Inc. "Product Specification", no date.*

(Continued)

*Primary Examiner*—Eric Thomas (57) ABSTRACT

An electrical-energy-storage unit (EESU) has as a basis material a high-permittivity composition-modified barium titanate ceramic powder. This powder is single coated with aluminum oxide and then immersed in a matrix of poly(ethylene terephthalate) (PET) plastic for use in screen-printing systems. The ink that is used to process the powders via screen-printing is based on a nitrocellulose resin that provide a binder burnout, sintering, and hot isostatic pressing temperatures that are allowed by the PET plastic. These lower temperatures that are in the range of 40° C. to 150° C. also allows aluminum powder to be used for the electrode material. The components of the EESU are manufactured with the use of conventional ceramic and plastic fabrication techniques which include screen printing alternating multilayers of aluminum electrodes and high-permittivity composition-modified barium titanate powder, sintering to a closed-pore porous body, followed by hot-isostatic pressing to a void-free body. The 31,351 components are configured into a multilayer array with the use of a solder-bump technique as the enabling technology so as to provide a parallel configuration of components that has the capability to store at least 52.22 kW·h of electrical energy. The total weight of an EESU with this amount of electrical energy storage is 281.56 pounds including the box, connectors, and associated hardware.

16 Claims, 2 Drawing Sheets

U.S. PATENT DOCUMENTS

| | | | |
|---|---|---|---|
| 5,116,790 A | 5/1992 | Bruno et al. | |
| 5,196,388 A | 3/1993 | Shyu | |
| 5,242,674 A | 9/1993 | Bruno et al. | |
| 5,417,956 A | 5/1995 | Moser | |
| 5,711,988 A | 1/1998 | Tsai et al. | 427/80 |
| 5,730,874 A | 3/1998 | Wai et al. | |
| 5,731,948 A * | 3/1998 | Yializis et al. | 361/313 |
| 5,738,919 A | 4/1998 | Thomas et al. | 429/3 |
| 5,744,258 A | 4/1998 | Bai et al. | 429/3 |
| 5,776,239 A | 7/1998 | Bruno | |
| 5,797,971 A | 8/1998 | Zheng et al. | 29/25.03 |
| 5,800,857 A | 9/1998 | Ahmad et al. | 427/80 |
| 5,833,905 A | 11/1998 | Miki | |
| 5,850,113 A | 12/1998 | Weimer et al. | 307/125 |
| 5,867,363 A | 2/1999 | Tsai et al. | 361/502 |
| 5,973,913 A | 10/1999 | McEwen et al. | 361/523 |
| 6,005,764 A | 12/1999 | Anderson et al. | 361/500 |
| 6,072,688 A | 6/2000 | Hennings et al. | |
| 6,078,494 A * | 6/2000 | Hansen | 361/321.5 |
| 6,195,249 B1 * | 2/2001 | Honda et al. | 361/306.3 |
| 6,243,254 B1 | 6/2001 | Wada et al. | 361/311 |
| 6,268,054 B1 * | 7/2001 | Costantino et al. | 428/403 |
| 6,294,620 B1 | 9/2001 | Huang et al. | |
| 6,331,929 B1 | 12/2001 | Masuda | |
| 6,352,681 B1 | 3/2002 | Horikawa et al. | |
| 6,410,157 B1 | 6/2002 | Nakamura | |
| 6,447,910 B1 | 9/2002 | Wataya | |
| 6,485,591 B1 | 11/2002 | Nakao | |
| 6,501,639 B2 | 12/2002 | Takafuji | |
| 6,550,117 B1 | 4/2003 | Tokuoka | |
| 6,673,274 B2 | 1/2004 | Venigalla et al. | |
| 6,692,721 B2 | 2/2004 | Hur et al. | |
| 6,703,719 B1 | 3/2004 | McConnell | |
| 6,715,197 B2 | 4/2004 | Okuyama | |
| 6,749,898 B2 | 6/2004 | Nakamura | |
| 6,905,989 B2 | 6/2005 | Ellis et al. | |
| 7,033,406 B2 | 4/2006 | Weir et al. | |
| 7,061,139 B2 | 6/2006 | Young | |
| 7,068,898 B2 | 6/2006 | Buretea et al. | |
| 7,228,050 B1 | 6/2007 | Buretea et al. | |
| 2001/0010367 A1 | 8/2001 | Burnell-Jones | |
| 2002/0186522 A1 * | 12/2002 | Honda et al. | 361/311 |
| 2003/0052658 A1 | 3/2003 | Baretich | |
| 2004/0135436 A1 | 7/2004 | Gilbreth | |
| 2006/0210779 A1 | 9/2006 | Weir et al. | |
| 2007/0148065 A1 | 6/2007 | Weir et al. | |
| 2008/0016681 A1 * | 1/2008 | Eisenring | 29/623.1 |

FOREIGN PATENT DOCUMENTS

| | | |
|---|---|---|
| JP | 11147716 A | 6/1999 |
| JP | 2003192343 | 7/2003 |
| WO | WO 93/16012 | 8/1993 |

OTHER PUBLICATIONS

K.A. Nishimura, "NiCd Battery", Science Electronics FAQ V1.00: Nov. 10, 1996.*

Ovonics, Inc. "Product Data Sheet", no date.*

Evercel, Inc., "Battery Data Sheet—Model 100", no date.*

D. Corrigan et al, "Nickel Metal Hydride Batteries For ZEV-Range Hybrid Electric Vehicles", no date.*

B Dickinson et al, "Issues and Benefits with Fast Charging Industrial Batteries", AeroVeronment, Inc., no date.*

S. A. Bruno, et al., J. Am Ceram. Soc. 76, 1233 (1933).*

J. Kuwata et al, "Electric Properties of Perovskite-Type Oxide Thin-Films Prepared by RF Sputtering", Jpn J. Appl. Phys., Part 1, 1985, 24 (Suppl. 24-2, Proc. Int. Meet. Ferroelectr. 6th), 413-15.*

F. Sears et al, "Capacitance—Properties of Dielectrics", University of Physics, Addison Wesley Publishing Company, Inc., Dec. 1957: pp. 468-486.*

U.S. Appl. No. 09/833,609.*

Mistubishi Polyester Film Corporation specification sheet for Hostaphan (R) RE film for capacitors, Edition Nov. 2003.*

U.S. Appl. No. 11/499,594.

U.S. Appl. No. 11/453,581.

U.S. Appl. No. 11/497,744.

Salvatore A. Bruno and Donald K. Swanson, "High-Performance Multilayer Capacitor Dielectrics from Chemically Prepared Powders," Journal of American Ceramic Society, vol. 76, No. 5, May 1993, pp. 1233-1241.

Beheir et al., "Studies on the liquid-liquid extraction and ion and precipitate flotation of Co(II) with decanoic acid," Journal of Radioanalytical and Nuclear Chemistry, Articles, vol. 174, No. 1 (1992) 13-22.

* cited by examiner

UTILIZATION OF POLY(ETHYLENE TEREPHTHALATE) PLASTIC AND COMPOSITION-MODIFIED BARIUM TITANATE POWDERS IN A MATRIX THAT ALLOWS POLARIZATION AND THE USE OF INTEGRATED-CIRCUIT TECHNOLOGIES FOR THE PRODUCTION OF LIGHTWEIGHT ULTRAHIGH ELECTRICAL ENERGY STORAGE UNITS (EESU)

BACKGROUND OF THE INVENTION

1. Field of the Invention

This invention relates generally to energy-storage devices, and relates more particularly to polarized high-permittivity ceramic powders immersed into a plastic matrix that has been used to fabricate components that are utilized in an array configuration for application in ultrahigh-electrical-energy storage devices.

2. Description of the Relevant Art

The internal-combustion-engine (ICE) powered vehicles have as their electrical energy sources a generator and battery system. This electrical system powers the vehicle accessories, which include the radio, lights, heating, and air conditioning. The generator is driven by a belt and pulley system and some of its power is also used to recharge the battery when the ICE is in operation. The battery initially provides the required electrical power to operate an electrical motor that is used to turn the ICE during the starting operation and the ignition system. The most common batteries in use today are flooded lead-acid, sealed gel lead-acid, Nickel-Cadmium (Ni—Cad), Nickel Metal Hydride (NiMH), and Nickel-Zinc (Ni—Z). References on the subject of electrochemical batteries include the following: Guardian, Inc., "Product Specification"; K. A. Nishimura, "NiCd Battery", Science Electronics FAQ V1.00: Nov. 20, 1996; Ovonics, Inc., "Product Data Sheet": no date; Evercel, Inc., "Battery Data Sheet—Model 100": no date; D. Corrigan, I. Menjak, B. Cleto, S. Dhar, S. Ovshinsky, Ovonic Battery Company, Troy, Mich., USA, "Nickle-Metal Hydride Batteries For ZEV-Range Hybrid Electric Vehicles"; B. Dickinson et al., "Issues and Benefits with Fast Charging Industrial Batteries", AeroVeronment, Inc. article: no date.

Each specific type of battery has characteristics, which make it either more or less desirable to use in a specific application. Cost is always a major factor and the NiMH battery tops the list in price with the flooded lead-acid battery being the most inexpensive. Evercel manufactures the Ni—Z battery and by a patented process, with the claim to have the highest power-per-pound ratio of any battery. See Table 1 below for comparisons among the various batteries. What is lost in the cost translation is the fact that NiMH batteries yield nearly twice the performance (energy density per weight of the battery) than do conventional lead-acid batteries. A major drawback to the NiMH battery is the very high self-discharge rate of approximately 5 to 10% per day. This would make the battery useless in a few weeks. The Ni—Cad battery as does the lead-acid battery also have self-discharge but it is in the range of about 1% per day and both contain hazardous materials such as acid or highly toxic cadmium. The Ni—Z and the NiMH batteries contain potassium hydroxide and this electrolyte in moderate and high concentrations is very caustic and will cause severe burns to tissue and corrosion to many metals such as beryllium, magnesium, aluminum, zinc, and tin.

Another factor that must be considered when making a battery comparison is the recharge time. Lead-acid batteries require a very long recharge period, as long as 6 to 8 hours. Lead-acid batteries, because of their chemical makeup, cannot sustain high current or voltage continuously during charging. The lead plates within the battery heat rapidly and cool very slowly. Too much heat results in a condition known as "gassing" where hydrogen and oxygen gases are released from the battery's vent cap. Over time, gassing reduces the effectiveness of the battery and also increases the need for battery maintenance, i.e., requiring periodic deionized or distilled water addition. Batteries such as Ni—Cad and NiMH are not as susceptible to heat and can be recharged in less time, allowing for high current or voltage changes which can bring the battery from a 20% state of charge to an 80% state of charge in as quick as 20 minutes. The time to fully recharge these batteries can take longer than an hour. Common to all present day batteries is a finite life and if they are fully discharged and recharged on a regular basis their life is reduced considerably.

SUMMARY OF THE INVENTION

In accordance with the illustrated preferred embodiment, the present invention provides a unique lightweight electrical-energy-storage unit that has the capability to store ultra-high amounts of energy.

The basis material, an aluminum oxide coated high-permittivity calcined composition-modified barium titanate powder which is a ceramic powder described in the following references: S. A. Bruno, D. K. Swanson, and I. Burn, J. Am. Ceram. Soc. 76, 1233 (1993); P. Hansen, U.S. Pat. No. 6,078,494, issued Jun. 20, 2000, and U.S. patent application Ser. No. 09/833,609, is used as the energy storage material for the fabrication of the electrical energy storage units (EESU).

Yet another aspect of the present invention is that the alumina-coated calcined composition-modified barium titanate (alumina-coated calcined CMBT) powder and the immersion of these powders into a poly(ethylene terephthalate) plastic matrix provides many enhancement features and manufacturing capabilities to the basis material. The alumina-coated calcined CMBT powder and the poly(ethylene terephthalate) plastic have exceptional high-voltage breakdown and when used as a composite with the plastic as the matrix the average voltage breakdown was $5.57 \times 10^6$ V/cm or higher. The voltage breakdown of the poly(ethylene terephthalate) plastic is 580 V/μm at 23° C. and the voltage breakdown of the alumina-coated CMBT powders is 610 V/μm at 85° C. The following reference indicates the dielectric breakdown strength in V/cm of composition-modified barium titanate materials: J. Kuwata et al., "Electrical Properties of Perovskite-Type Oxide Thin-Films Prepared by RF Sputtering", Jpn. J. Appl. Phys., Part 1, 1985, 24(Suppl. 24-2, Proc. Int. Meet. Ferroelectr., $6^{th}$), 413-15. The following reference indicates the dielectric breakdown strength in V/μm of poly(ethylene terephthalate) materials: Mitsubishi Polyester Film corporation specification sheet for ®Hostaphan RE film for capacitors, Edition 11/03. This very-high-voltage breakdown assists in allowing the ceramic EESU to store a large amount of energy due to the following: Stored energy $E=CV^2/2$, Formula 1, as indicated in F. Sears et al., "Capacitance—Properties of Dielectrics", University Physics, Addison-Wesley Publishing Company, Inc.: December 1957: pp 468-486, where C is the capacitance, V is the voltage across the EESU terminals, and E is the stored energy. This indicates that the energy of the EESU increases with the square of the voltage.

Figure 1:
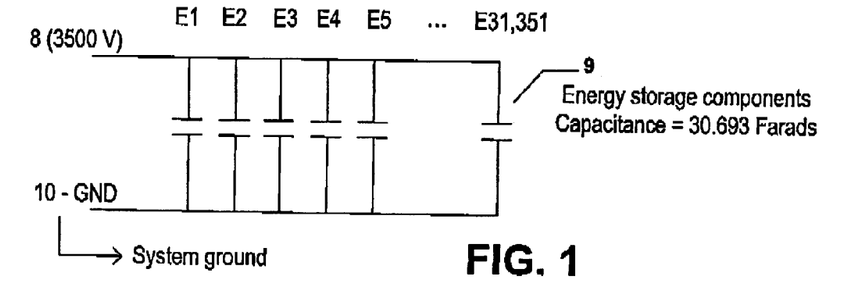
FIG. 1 indicates a schematic of 31,351 energy storage components 9 hooked up in parallel with a total capacitance of 30.693 F. The maximum charge voltage 8 of 3500 V is indicated with the cathode end of the energy storage components 9 hooked to system ground 10.

FIG. 1 indicates that a double array of 31,351 energy storage components 9 in a parallel configuration that contains the alumina-coated calcined composition-modified barium titanate powder. Fully densified ceramic components of this powder coated with 100 Å of aluminum oxide (alumina) 8 and a 100 Å of poly(ethylene terephthalate) plastic as the matrix 8 with a dielectric thickness of 9.732 µm can be safely charged to 3500 V. The number of components used in the double array depends on the electrical energy storage requirements of the application. The components used in the array can vary from 2 to 10,000 or more. The total number of components used in the arrays for the example of this invention was 31,351. The total capacitance of these particular arrays 9 was 30.693 F which will allow 52,220 W·h of energy to be stored as derived by Formula 1.

The alumina-coated calcined CMBT powder and the poly(ethylene terephthalate) plastic matrix also assist in significantly lowering the leakage and aging of ceramic components comprised of the calcined composition-modified barium titanate powder to a point where they will not affect the performance of the EESU. In fact, the discharge rate of the EESU will be lower than 0.1% per 30 days which is approximately an order of magnitude lower than the best electrochemical battery.

A significant advantage of the present invention is that the PET plastic matrix assists in lowering the sintering temperature to 150° C. and hot-isostatic-pressing temperatures to 180° C. and the required pressure to 100 bar. These lower temperatures eliminate the need to use very expensive platinum, palladium, palladium-silver alloy, or less expensive but still costly nickel powders as the terminal metal. In fact, these temperatures are in a safe range that allows aluminum, the fourth best conductor, to be used for the electrodes, providing a major cost saving in material expense and also power usage during the hot-isostatic-pressing process. Aluminum as a metal is not hazardous. The lower pressure provides low processing cost for the hot-isostatic-pressing step. Also, since the PET plastic becomes easily deformable and flowable at these temperatures, voids are readily removed from the components during the hot-isostatic-pressing process. A manufacturer of such hot-isostatic-pressing ovens is Material Research Furnaces Inc. For the EESU product to be successful it is mandatory that all voids be eliminated so that the high-voltage breakdown can be obtained. Also, the method described here of using the poly(ethylene terephthalate) plastic as the matrix for the high-relativity-permittivity alumina-coated composition-modified barium titanate powder ensures the hot-isostatic-pressing results in layers that are uniform homogeneous and void free.

None of the EESU materials used to fabricate the EESU, which are aluminum, aluminum oxide, copper, composition-modified barium titanate powder, silver-filled epoxy, and poly(ethylene terephthalate) plastic will explode when being recharged or impacted. Thus the EESU is a safe product when used in electric vehicles, buses, bicycles, tractors, or any device that is used for transportation or to perform work, portable tools of all kinds, portable computers, or any device or system that requires electrical energy storage. It could also be used for storing electrical power generated from electrical energy generating plants, solar voltaic cells, wind-powered electrical energy generating units, or other alternative sources on the utility grids of the world for residential, commercial, or industrial applications. The power averaging capability of banks of EESU devices with the associated input/output converters and control circuits will provide significant improvement of the utilization of the power generating plants and transmission lines on the utility grids of the world. The EESU devices along with input/output converters and control circuits will also provide power averaging for all forms of alternative energy producing technology, but specifically wind and solar will have the capability to provide constant electrical power due to the EESU storing sufficient electrical energy that will meet the energy requirements of residential, commercial, and industrial sites. In fact, wind could become a major source of electrical energy due to the capability of the EESU technology to convert wind from a peak provider, i.e., when the wind blows and power is needed it is used, to a cost-effective primary electrical energy supplier, such as are coal-fired plants.

Figure 2:
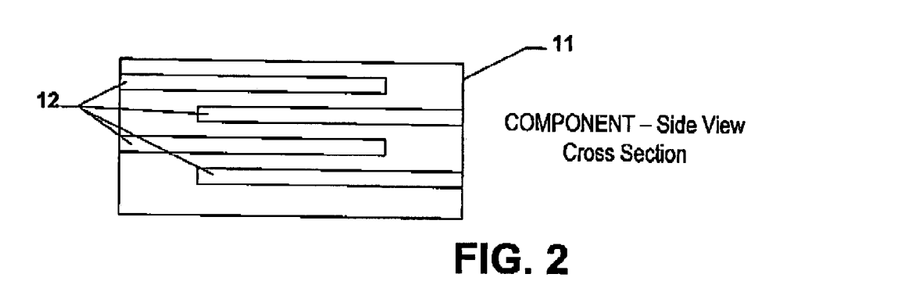
FIG. 2 is a cross-section side view of the electrical-energy-storage unit component. This figure indicates the alternating layers of aluminum electrode layers 12 and high-permittivity composition-modified barium titanate dielectric in a poly(ethylene terephthalate) plastic matrix developed into layers 11. This figure also indicates the alternately offset aluminum electrode layers 12 so that each storage layer is connected in parallel.

Yet another aspect of the present invention is that each component of the EESU is produced by screen-printing multiple layers of aluminum electrodes with screening ink from aluminum powder. Interleaved between aluminum electrodes are dielectric layers with screening ink from calcined alumina-coated high-permittivity composition-modified barium titanate powder immersed in poly(ethylene terephthalate) plastic as the matrix. A unique independent dual screen-printing and layer-drying system is used for this procedure. Each screening ink contains appropriate amounts of nitrocellulose, glycerol, and isopropyl alcohol, resulting in a proper rheology for screen printing each type of layer: the aluminum electrode, the alumina-coated composition-modified barium titanate ceramic powder immersed in the poly(ethylene terephthalate) plastic dielectric, and the poly(ethylene terephthalate) plastic dielectric by itself. The number of these layers can vary depending on the electrical energy storage requirements. Each layer is dried; the binder burned out, and sintered before the next layer is screen-printed. Each aluminum electrode layer 12 is alternately offset to each of two opposite sides of the component automatically during this process as indicated in FIG. 2. These layers are screen-printed on top of one another in a continuous manner. When the specified number of layers is achieved, the array is cut into individual components to the specified sizes. In the example, the size is length=0.508 cm and the width 1.143 cm with an area=0.581 cm$^2$.

Figure 3:
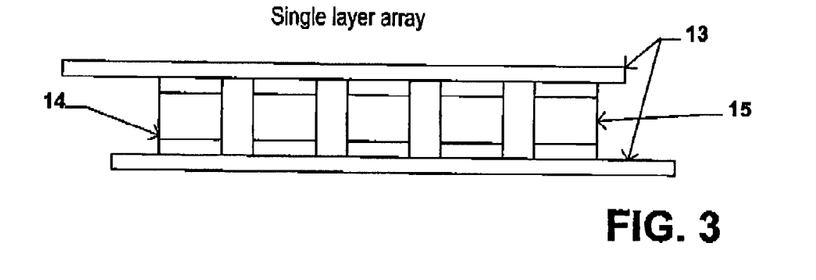
FIG. 3 is side view of a single-layer array indicating the attachment of individual components 15 with the aluminum end caps attached by silver-filled epoxy resin 14 attached to two opposite polarity copper conducting sheets 13.
Figure 4:
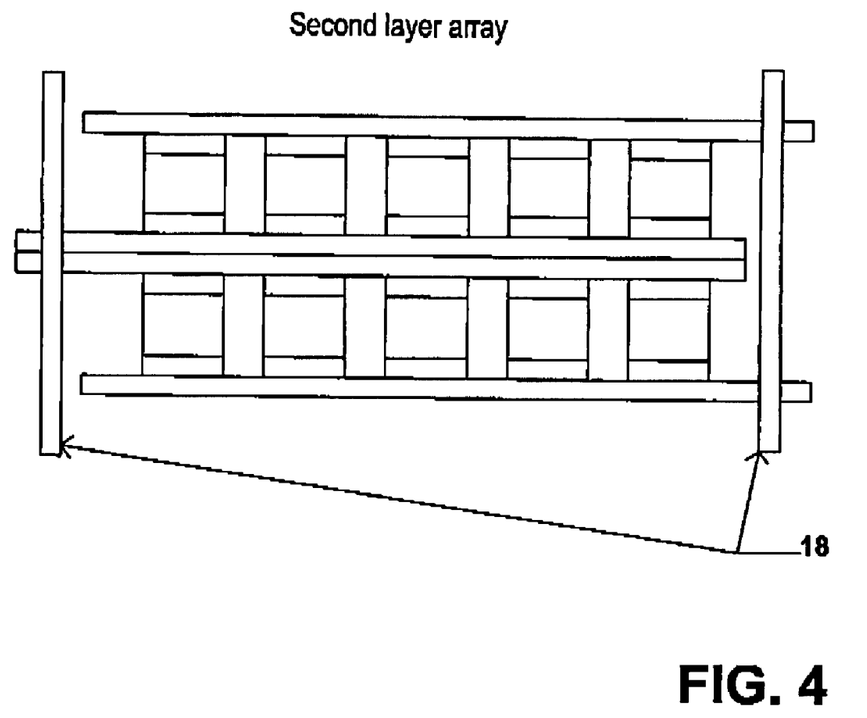
FIG. 4 is a side view of a double-layer array with copper array connecting aluminum end caps bonded with silver-filled epoxy resin 16 and then attaching the two arrays via the edges of the opposite polarity copper conductor sheets 13. This figure indicates the method of attaching the components in a multilayer array to provide the required energy storage.

After each screen-printing operation in which a green sheet is fabricated having either 1 µm for the final thickness of the aluminum layers or 9.732 µm for the final thickness of the dielectric layer, or final thicknesses for the aluminum and dielectric layers that are suitable for the particular application, a drying, binder-burnout, and sintering operation is completed. The oven has multiple temperature zones that range from 40° C. to 125° C. and the green sheets are passed through these zones at a rate that avoids any cracking and delamination of the body. After this process is completed the components are then properly prepared for the hot isostatic pressing (HIP) at 180° C. and 100 bar pressure. The HIP processing time was 45 minutes which included a 10 minute temperature ramp time and a 5 minute cooldown time. This process eliminated all voids. After this process the components are then abrasively cleaned on the connection side to expose the alternately offset interleaved aluminum electrodes 12. Then aluminum end caps 14 are bonded onto each end component 15 that has the aluminum electrodes exposed with the use of a silver-filled epoxy resin as the adhesive. The components are then cured at 100° C. for 10 minutes to bond the aluminum end caps to the components as indicated in FIG. 3. The next step involves polarizing the components. As many as 6000 components are held in a tool. This holding tool is then placed into a fixture that retains the components between anode and cathode plates. Each anode and cathode is spring-loaded to ensure electrical contact with each component. The fixture is then placed into an oven where the processing temperature is increased to 180° C. over a period of 20 minutes. At the temperature of 180° C., voltages of −2000 V is applied to the cathode plates and +2000 V is applied to the anode plates, or voltages selected for the particular dielectric thickness, for a period of 5 minutes. At the completion of this process the alumina-coated composition-modified barium titanate powder immersed within the poly(ethylene terephthalate) plastic matrix will be fully polarized. The components are then assembled into a first-level array, FIG. 3, with the use of the proper tooling. The aluminum end caps are bonded onto the copper plates with silver filled epoxy resin. Then the first-level arrays are assembled into a second-level array, FIG. 4, by stacking the first array layers on top of one another in a preferential mode. This process is continued until sufficient numbers of arrays are stacked to obtain the desired energy storage for the particular EESU that is being produced. Then copper bars 18 are attached on each side of the arrays as indicated in FIG. 4. Then the EESU is packaged into its final assembly.

The features of this invention indicate that the EESU, as indicated in Table 1, outperforms the electrochemical battery in every parameter. This technology will provide mission-critical capability to many sections of the energy-storage industry.

TABLE 1

The parameters of each technology to store 52.22 kW · h of electrical energy are indicated - (data from manufacturers' specification sheets).

|  | EESU | NiMH | LA (Gel) | Ni-Z | Li-Ion |
|---|---|---|---|---|---|
| Weight (pounds) | 286.56 | 1716 | 3646 | 1920 | 752 |
| Volume (inch$^3$) | 4541 | 17,881 | 43,045 | 34,780 | 5697 |
| Discharge rate/ 30 days | 0.1% | 5% | 1% | 1% | 1% |
| Charging time (full) | *3-6 min | 1.5 hr | 8.0 hr | 1.5 hr | 6.0 hr |
| Life reduced with deep cycle use | none | moderate | high | moderate | high |
| Hazardous materials | NONE | YES | YES | YES | YES |

*The charging time is restricted by the converter circuits not the EESU.

This EESU will have the potential to revolutionize the electric vehicle (EV) industry, provide effective power averaging for the utility grids, the storage and use of electrical energy generated from alternative sources with the present utility grid system as a backup source for residential, commercial, and industrial sites, the electric energy point of sales to EVs, provide mission-critical power storage for many military programs. The EESU will replace the electrochemical battery in any of the applications that are associated with the above business areas.

The features and advantages described in the specifications are not all inclusive, and particularly, many additional features and advantages will be apparent to one of ordinary skill in the art in view of the description, specification and claims hereof. Moreover, it should be noted that the language used in the specification has been principally selected for readability and instructional purposes, and may not have been selected to delineate or circumscribe the inventive subject matter, resort to the claims being necessary to determine such inventive subject matter.

REFERENCE NUMERALS IN DRAWING

8 System maximum voltage of 3500 V
9 31,351 energy-storage components hooked up in parallel with a total capacitance of 30.693 F
10 System ground
11 High-permittivity calcined alumina-coated composition-modified barium titanate powder dispersed in poly(ethylene terephthalate) plastic matrix dielectric layers
12 Alternately offset aluminum electrode layers
13 Copper conductor sheets
14 Aluminum end caps
15 Components
16 Copper array connecting aluminum end caps

DETAILED DESCRIPTION OF THE PREFERRED EMBODIMENTS

FIGS. 1, 2, 3, and 4 of the drawings and the following description depict various preferred embodiments of the present invention for purposes of illustration only. One skilled in the art will readily recognize from the following discussion those alternative embodiments of the structures and methods illustrated herein may be employed without departing from the principles of the invention described herein. While the invention will be described in conjunction with the preferred embodiments, it will be understood that they are not intended to limit the invention to those embodiments. On the contrary, the invention is intended to cover alternatives, modifications, and equivalents, which may be included within the spirit and scope of the invention as defined by the claims.

The screen printing of the alumina-coated composition-modified barium titanate powder and poly(ethylene terephthalate) plastic powder mixture as an ink requires that the particle sizes of these two components be nearly the same. In the example, the average particle size was 0.64 μm. Since the poly(ethylene terephthalate) plastic is not available in powder form, but only as pellets, these pellets must be pulverized to submicron-sized powder. The plastic being relatively soft must be cryogenically embrittled so that it will fragment by impact shattering.

Similarly, aluminum powder is available at economical pricing in particle sizes that are too large for this application. However, in the same way as described for the poly(ethylene terephthalate) (PET) plastic pellets, aluminum being a relatively soft metal, its powder can be embrittled cryogenically and then fragmented by impact shattering.

Systems to accomplish this task have been developed for cryogenic freezing of the plastic pellets and the aluminum powders: the Air Products Process Cooling System, and for impact jet pulverizing of these cryogenic-frozen pellets and the aluminum powder: the Micron-Master jet mill manufactured by The Jet Pulverizer Company.

The binder for the screen-printing ink consists of the lowest-decomposition-temperature resin: nitrocellulose and two solvents for the resin: glycerol and isopropyl alcohol, the former being more viscous than the latter, so that the proper screen-printing rheology can be easily adjusted.

Three screen-printing inks are required:
1. poly(ethylene terephthalate) plastic powder, alumina-coated composition-modified barium titanate ceramic powder, and the binder.
2. poly(ethylene terephthalate) plastic powder and the binder
3. aluminum metal powder and the binder For the case of the first screen-printing ink with respect to the volume ratio of the plastic powder to the ceramic powder, this ratio can range from 35/65 to 6/94. The high-relative-permittivity dielectric layers are formed from this ink with final thicknesses after hot isostatic pressing ranging from 5 to 20 μm. With the second screen-printing ink, the surrounding low-relative-permittivity dielectric layers are formed of equal final thickness to the high-relative-permittivity layers or the aluminum electrode layers. The purpose of these layers is to avoid electric-field fringing at the edges of the high-relative-permittivity layers. With the third screen-printing ink, the aluminum electrodes are formed with final thickness after hot isostatic pressing ranging from 1 to 2 μm.

The screen-printing of the materials for the multilayer capacitor array requires the plastic, ceramic, and metal powders to be comparable particle size. Since the ceramic powder is in-situ coprecipitated from aqueous solution as submicron in size, commercially available poly(ethylene terephthalate) plastic pellets and aluminum powder have to be reduced in size. These relatively soft materials must be cooled to cryogenic temperatures to enable embrittlement to occur. Then by jet impact of the chilled materials, shattering occurs. With several passes of the chilled material through the jet pulverizer the particles are reduced to submicron size.

The chilling of the material is carried out in a cryogenic cooling conveyer that cool the poly(ethylene terephthalate) plastic pellets to −150° C. This conveyer is then the feeder of the chilled material to the air jet pulverizer.

A basis layer of the plastic powder and binder is screen-printed onto a flat Teflon® polytetrafluoroethylene plastic-coated stainless steel plate, this first layer serving as a substrate and dielectric layer isolating the next aluminum electrode layer from contact with the outside. The Teflon® plastic coating on the stainless steel plates keeps the elements from sticking to the plate surface during the heat treatment of the green sheets after each screen-printing step.

The next layer comprised of aluminum powder and binder is screen-printed onto the first layer with a stencil, this second layer serving as the electrode and is offset to one end of the dielectric layer.

As part of the second layer and surrounding the electrodes layer on three of its sides, a layer of plastic powder and binder is screen-printed with a stencil onto the first layer.

A third layer of plastic powder, ceramic powder, and binder is screen-printed onto the second layer with a stencil, this third layer serving as the active dielectric layer.

As part of the third layer and surrounding the active dielectric layer on all four of its sides, a layer of plastic powder and binder is screen-printed with a stencil onto the second layer.

A fourth layer of aluminum powder and binder is screen-printed with a stencil onto the third layer, this fourth layer serving as the opposite electrode to the active dielectric layer and is offset to the opposite end of the dielectric layer.

As part of the fourth layer and surrounding the electrode layer on three of its sides, a layer of plastic powder and binder is screen-printed with a stencil onto the third layer.

This collection of steps except the first step is repeated any number of times, anywhere from one to a thousand. Arrays of 100 dielectric and electrode layers were used to produce elements for the proof-of-concepts development. In this fashion the multilayer array is built up.

The last concluding step is a repeat of the first step.

After each screen-printing step the Teflon® plastic-coated stainless steel plate containing the just-deposited green sheet is processed by an inline oven. This oven provides two functions with the first being binder burnout and the second being the sintering and densification to the closed pore porous condition. This oven has multiple heating zones with the first zone at temperature of 40° C. and the last zone at temperature of 150° C. The time for the elements to be processed through these zones will depend on the thickness of the green layer, but was in the range of 10 seconds for the electrode layers and 60 seconds for the dielectric layers for the elements fabricated for the example of this invention. The processing time must be selected to ensure that the green layers do not destructively crack and rupture.

The screen-printed sheets of the multilayer elements are diced into individual elements. The elements dimensions are 0.508 cm by 1.143 cm.

The elements are then placed into the indentations of Teflon® plastic-coated stainless steel trays. The trays have the capability to hold 6,000 elements. The Teflon® plastic coating prevents the elements from sticking to the stainless steel tray. The trays containing the elements are then inserted into a hot isostatic pressing (HIP) oven capable of 100 bar pressure with clean dry air and 180° C. temperature is employed. The processing time of this HIP process is 45 minutes which includes a 10 minute temperature ramp up time and a 5 minute cooldown time.

Then ten elements are then bonded together with an adhesive having a curing temperature of 80° C. for duration of 10 minutes.

After completion of the bonding step the aluminum electrode layers at two opposite ends of the multilayer array are connected to one another of the same side after these sides have been abrasively cleaned to expose the aluminum electrodes. A high-conductivity silver-loaded epoxy resin paste with elastomeric characteristic (mechanical shock absorption) is selected to connect the aluminum electrode layers of the multilayer array to the aluminum end caps for attachment by silver-filled epoxy resin.

The completed multilayer components are poled by applying a polarizing electric field across each of the active dielectric layers. Since there layers are electrically parallel within each multilayer array and that these multilayer arrays can be connected in parallel, the applied voltage to accomplish the polarizing electric field can be as high as the working voltage. The components are heated in an oven to at least 180° C. before the polarizing voltage is applied. A temperature of 180° C. and applied voltages of +2000 V and −2000 V for a duration of 5 minutes were utilized in the example of this invention.

Ink Slurry Mixer and Disperser

The ink slurry mixer and disperser is comprised of a polyethylene plastic or polypropylene plastic tank, a Teflon® polytetrafluoroethylene-plastic-coated stainless steel paddle mixer, ultrasonic agitation, and multiple recirculating peristaltic pumps with the associated tubing. The slurry as multiple streams are recirculated from the tank bottom and at the tank top reintroduced with the multiple streams oppositely directed toward on another. This high impact of the powders in these multiple streams will ensure that any retained charges are released, thus providing a well-dispersed ink free of agglomerates suitable for screen printing.

Ink Delivery to the Screen Printer

Each of the three screen-printing inks is delivered to the appropriate stations of the screen-printing system. Peristaltic pumps with their associated plastic tubing are used to convey the inks from the polyethylene plastic or polypropylene plastic tanks employed for ink making to a line manifold with several equal-spaced holes located at one edge of each printing screen, so as to distribute the ink uniformly at this edge. Higher pressure peristaltic pumps are used so that essentially all the pressure drop occurs at the manifold hole exits.

Example

The electrical-energy-storage unit's weight, stored energy, volume, and configuration design parameters The relative permittivity of the high-permittivity powder to be achieved is 21,072.

The 100 Å coating of $Al_2O_3$ and 100 Å of poly(ethylene terephthalate) plastic will reduce the relative permittivity by 12%.

The resulting K=18,543

Energy stored by a capacitor: $E=CV^2/(2\times 3600 \text{ s/h})=W\cdot h$

C=capacitance in farads (F)

V=voltage across the terminals of the capacitor

It is estimated that is takes 14 hp, 746 W per hp, to power an electric vehicle running at 60 mph with the lights, radio, and air conditioning on. The energy-storage unit must supply 52,220 W·h or 10,444 W for 5 hours to sustain this speed and energy usage and during this period the EV will have traveled 300 miles.

Design parameter for energy storage—W=52.22 kW·h

Design parameter for working voltage—V=3500 V

Resulting design parameter of capacitance—C=30.693 F $C=\epsilon_0 KA/t$ $\epsilon_0$=permittivity of free space K=relative permittivity of the material A=area of the energy-storage component layers t=thickness of the energy-storage component layers Test data of materials, layers, cells, elements, developed components, and the final EESU.

The area of the element, which has 100 cells (capacitors) screen-printed layers, is as follows:

Area=0.508 cm×1.143 cm=0.5806 cm$^2$

The resulting design parameter for dielectric layer thickness—t=9.732×10$^{-4}$ cm Volume of the dielectric layer=0.5806 cm$^2$×9.732×10$^{-4}$ cm=0.0005651 cm$^3$ Weight of the alumina-coated composition-modified barium titanate powder=(0.0005651 cm$^3$×1000×31,351×6.5 g/cm$^3$×0.94)=238.43 pounds Weight of the poly(ethylene terephthalate) powder= (0.0005651 cm$^3$×1000×31,351×1.4 g/cm$^3$×0.04) =2.185 pounds The electrode layer thickness=1 μm Volume of the electrode=0.5806 cm$^2$×1 μm=5.806×10$^{-5}$ cm$^3$ Weight of the aluminum powder=(5.806×10$^{-5}$ cm$^3$× 1010×31,351×2.7 g/cm$^3$)=10.93 pounds Total weight of the EESU including the box, connectors, and associated hardware Wt=281.56 pounds Capacitance of one component=(8.854×10$^{-12}$ F/m× 1.8543×10$^{-4}$×5.806×10$^{-5}$ m$^2$/9.73×10$^{-6}$ m)×10 elements×100 cells=0.000979 F Number of components required to store 52.22 kW·h of electrical energy:

$N_c$=30.693 F/0.000979 F=31,351.379≅31,351

The following data indicates the results of pulverizing the poly(ethylene terephthalate) plastic pellets.

| % Volume | Size in μm |
|---|---|
| 0.25 | .2 |
| 0.35 | .3 |
| 2.1 | .4 |
| 15 | .5 |
| 58.55 | .6 |
| 16 | .7 |
| 5 | .8 |
| 0.25 | 1 |

Average size of the PET plastic powder is 0.64 μm.

The following data indicates the results of the pulverizing of the aluminum powder

| % volume | Size in μm |
|---|---|
| .12 | .05 |
| .7 | .07 |
| 2.5 | 1.2 |
| 17 | 1.9 |
| 59.5 | 2.3 |
| 16 | 2.9 |
| 3.1 | 3.4 |
| .41 | 3.9 |

Average aluminum particle size = 2.4 μm

The following data indicates the relativity permittivity of ten single-coated composition-modified barium titanate powder batches.

| Batches | Relativity Permittivity @ 85° C. |
|---|---|
| 1. | 19,901 |
| 2. | 19,889 |
| 3. | 19,878 |
| 4. | 19,867 |
| 5. | 19,834 |
| 6. | 19,855 |
| 7. | 19,873 |
| 8. | 19,856 |
| 9. | 19,845 |
| 10. | 19,809 |

Average relativity permittivity = 19,861

The following data indicates the relativity permittivity of ten components measured at 85° C., then 85° C. and 3500 V, and the last test 85° C. and 5000 V.

| Components | 85° C. | 85° C.-3500 V | 85° C.-5000 V |
|---|---|---|---|
| 1. | 19,871 | 19,841 | 19,820 |
| 2. | 19,895 | 19,866 | 19,848 |
| 3. | 19,868 | 19,835 | 19,815 |
| 4. | 19,845 | 19,818 | 19,801 |
| 5. | 19,881 | 19,849 | 19,827 |
| 6. | 19,856 | 19,828 | 19,806 |
| 7. | 19,874 | 19,832 | 19,821 |
| 8. | 19,869 | 19,836 | 19,824 |
| 9. | 19,854 | 19,824 | 19,808 |
| 10. | 19,877 | 19,841 | 19,814 |
| Average K | 19,869 | 19,837 | 19,818 |

Results indicates that the composition-modified barium titanate powder that has been coated with 100 Å of $Al_2O_3$, immersed into a matrix of PET plastic, and has been polarized provides a dielectric saturation that is above the 5000 V limit and the relative permittivity is highly insensitive to both voltage and temperature.

Leakage current of ten EESUs that contain 31,351 components each and having the capability of storing 52.22 kW·h of electrical energy measured at 85° C. and 3500 V.

| EESU | Leakage Current - μA |
|---|---|
| 1. | 4.22 |
| 2. | 4.13 |
| 3. | 4.34 |
| 4. | 4.46 |
| 5. | 4.18 |
| 6. | 4.25 |
| 7. | 4.31 |
| 8. | 4.48 |
| 9. | 4.22 |
| 10. | 4.35 |
| Average leakage current | 4.28 |

Voltage breakdown of ten components with and average dielectric thickness of 9.81 μm measured at a temperature of 85° C.

| Component | Voltage Breakdown - $10^6$ V/cm |
|---|---|
| 1. | 5.48 |
| 2. | 5.75 |
| 3. | 5.39 |
| 4. | 5.44 |
| 5. | 5.36 |
| 6. | 5.63 |
| 7. | 5.77 |
| 8. | 5.37 |
| 9. | 5.64 |
| 10. | 5.88 |
| Average voltage breakdown | 5.57 |

Full charge/discharge cycles of a component from 3500 V to 0 V at 85° C. After each 100,000 cycles the leakage current was recorded. The leakage current was multiplied by 31,351 to reflect the full EESU value. The rise time on the charging voltage was 0.5 seconds and the discharge time was 1.0 seconds. The RC time constant was 0.11 seconds for both the charging and the discharging times. The voltage breakdown was tested at the end of $10^6$ cycles and was measured at 85° C. with the results being $5.82 \times 10^6$ V/cm and the total capacitance was measured at 30.85 F. The final test data indicates that the full cycle testing did not degrade the total capacitance, leakage, or voltage breakdown capabilities of the component.

| Test cycle | Leakage Current - μA |
|---|---|
| 1. | 4.29 |
| 2. | 4.28 |
| 3. | 4.21 |
| 4. | 4.38 |
| 5. | 4.30 |
| 6. | 4.42 |
| 7. | 4.31 |
| 8. | 4.26 |
| 9. | 4.46 |
| 10. | 4.41 |

From the above description, it will be apparent that the invention disclosed herein provides a novel and advantageous electrical-energy-storage unit composed of unique materials and processes. The foregoing discussion discloses and describes merely exemplary methods and embodiments of the present invention. As will be understood by those familiar with the art, the invention may be embodied in other specific forms and utilize other materials without departing from the spirit or essential characteristics thereof. Accordingly, the disclosure of the present invention is intended to be illustrative, but not limiting, of the scope of the invention, which is set forth in the following claims.

What is claimed is:

1. An electrical-energy-storage unit fabricated by a method, the method comprising:
    a) cooling poly(ethylene terephthalate) plastic pellets to −150° C. by a cooling system;
    b) feeding the poly(ethylene terephthalate) plastic pellets at −150° C. into a jet pulverizing mill to pulverize the poly(ethylene terephthalate) plastic pellets to a submicron size poly(ethylene terephthalate) plastic powder;
    c) cooling aluminum powder to −150° C.;
    d) feeding the aluminum powder into a jet pulverizing mill to pulverize the aluminum powder to a submicron size;
    e) forming a first screen-printing ink from alumina-coated composition-modified barium titanate ceramic powder, the poly(ethylene terephthalate) plastic powder, and a binder, the binder including nitrocellulose, glycerol, and isopropyl alcohol;
    f) forming a second screen-printing ink from the poly(ethylene terephthalate) plastic powder and the binder;
    g) forming a third screen-printing ink from the aluminum powder and the binder;
    h) wherein each ink is independently mixed in an associated tank that has the capability to mechanical mix, provide ultrasonic agitation, and high-impact multiple oppositely directed streams;
    i) independently delivering each ink from its associated tank to an associated station of a screen-printing system via high-pressure pumps to a line manifold with several equal-spaced holes located at an edge of each printing screen;
    j) screen-printing a basis layer of the second screen-printing ink onto a flat polytetrafluoroethylene coated stainless steel plate;
    k) screen-printing a second layer of the third screen-printing ink via a stencil for an electrode layer;
    l) screen-printing as part of the second layer and surrounding the electrode layer on three sides, the second screen-printing ink via a stencil onto the first layer;

m) screen-printing a third layer of the first screen-printing ink via a stencil onto the second layer, the third layer serving as an active dielectric layer;

n) screen-printing as part of the third layer and surrounding the active dielectric layer on four sides, the second screen-printing ink via a stencil onto the second layer;

o) screen-printing a fourth layer of the third screen-printing ink via a stencil onto the third layer, the fourth layer serving as an opposite electrode to the active dielectric layer;

p) screen-printing as part of the fourth layer and surrounding the opposite electrode on three sides, the second screen-printing ink via a stencil onto the third layer;

q) repeating steps m through p 100 times to fabricate multilayer sheets;

r) after each screen-printing, processing the multilayer sheets by an inline oven which has multiple temperature zones that range from 40° C. to 150° C. at a speed, such that the through times are 10 seconds for the electrode layers and 60 seconds for the dielectric layers;

s) dicing the multilayer sheets into individual elements;

t) placing the elements into indentations of coated stainless steel trays and inserting the trays into a hot isostatic pressing oven to process the elements at a temperature of 180° C. and a pressure of 100 bar with a total time of 45 minutes;

u) bonding together ten of said elements with an adhesive having a curing temperature of 80° C. for a duration of 10 minutes to create a component;

v) abrasively cleaning the component to expose alternately offset interleaved aluminum electrodes to each of the two opposite sides of the component and bonding aluminum end caps to the component sides that have the exposed electrodes;

w) placing the component into an oven and ramping the temperature to 180° C. over 20 minutes, applying +2000 V to a first set of the electrodes and −2000 V to a second set of the electrodes for 5 minutes;

x) assembling the component into a first level array;

y) stacking a number of the first level arrays on top of one another; and z) packaging the array stack into the electrical energy storage unit.

2. The electrical energy storage unit of claim 1, wherein the poly(ethylene terephthalate) plastic powder has an average particle size of 0.64 μm.

3. The electrical energy storage unit of claim 1, wherein the aluminum powder has an average particle size of 0.24 μm.

4. The electrical energy storage unit of claim 1, wherein a binder-burnout temperature is 40° C., a sintering temperature is 150° C., and a hot-isostatic-pressing temperature is 180° C.

5. The electrical energy storage unit of claim 1 wherein the first, second and third screen-printing inks are free of agglomerates.

6. The electrical energy storage unit of claim 1, wherein the first level arrays in the electrical-energy storage unit are connected in a parallel configuration.

7. The electrical energy storage unit of claim 1, wherein layers of poly(ethylene terephthalate) plastic at the edges of the component are not connected to the end caps to reduce electric field fringing to a level that assists in providing an average voltage breakdown of at least $5.57 \times 10^6$ V/cm.

8. The electrical energy storage unit of claim 1, wherein a composite of alumina-coated calcined composition-modified barium titanate and poly(ethylene terephthalate) plastic has an average voltage breakdown of at least $5.57 \times 10^6$ V/cm.

9. The electrical energy storage unit of claim 1, wherein the hot-isostatic-pressing assists in providing an average voltage breakdown of at least $5.57 \times 10^6$ V/cm.

10. The electrical energy storage unit of claim 1, wherein the electrical-energy storage unit has an average total current leakage of 4.28 μA at an ambient temperature of 85° C. with 3500 V applied across the first and second sets of the electrodes.

11. The electrical energy storage unit of claim 1, wherein the electrical-energy storage unit has a stable relativity permittivity up to a temperature of 85° C. and voltages up to 5000 V.

12. The electrical energy storage unit of claim 1, wherein the electrical-energy storage unit has polarization of the alumina-coated calcined composition-modified barium titanate particles in a poly(ethylene terephthalate) matrix.

13. The electrical energy storage unit of claim 1, wherein the electrical-energy storage unit has a volume of 4541 inch$^3$.

14. The electrical energy storage unit of claim 1, wherein the component withstands 1,000,000 full voltage cycles of 3500 V to 0 V, then back to 3500 V without degrading the leakage, capacitance, or voltage breakdown capabilities of the component.

15. The electrical energy storage unit of claim 1, wherein the electrical-energy storage unit stores up to 52.22 kW-h of electrical energy.

16. The electrical energy storage unit of claim 1, wherein the electrical-energy storage unit has a total weight of 281.56 pounds including covers, connectors, and associated hardware.

* * * * *